2,770,663
SOLVENT EXTRACTION OF HYDROCARBONS

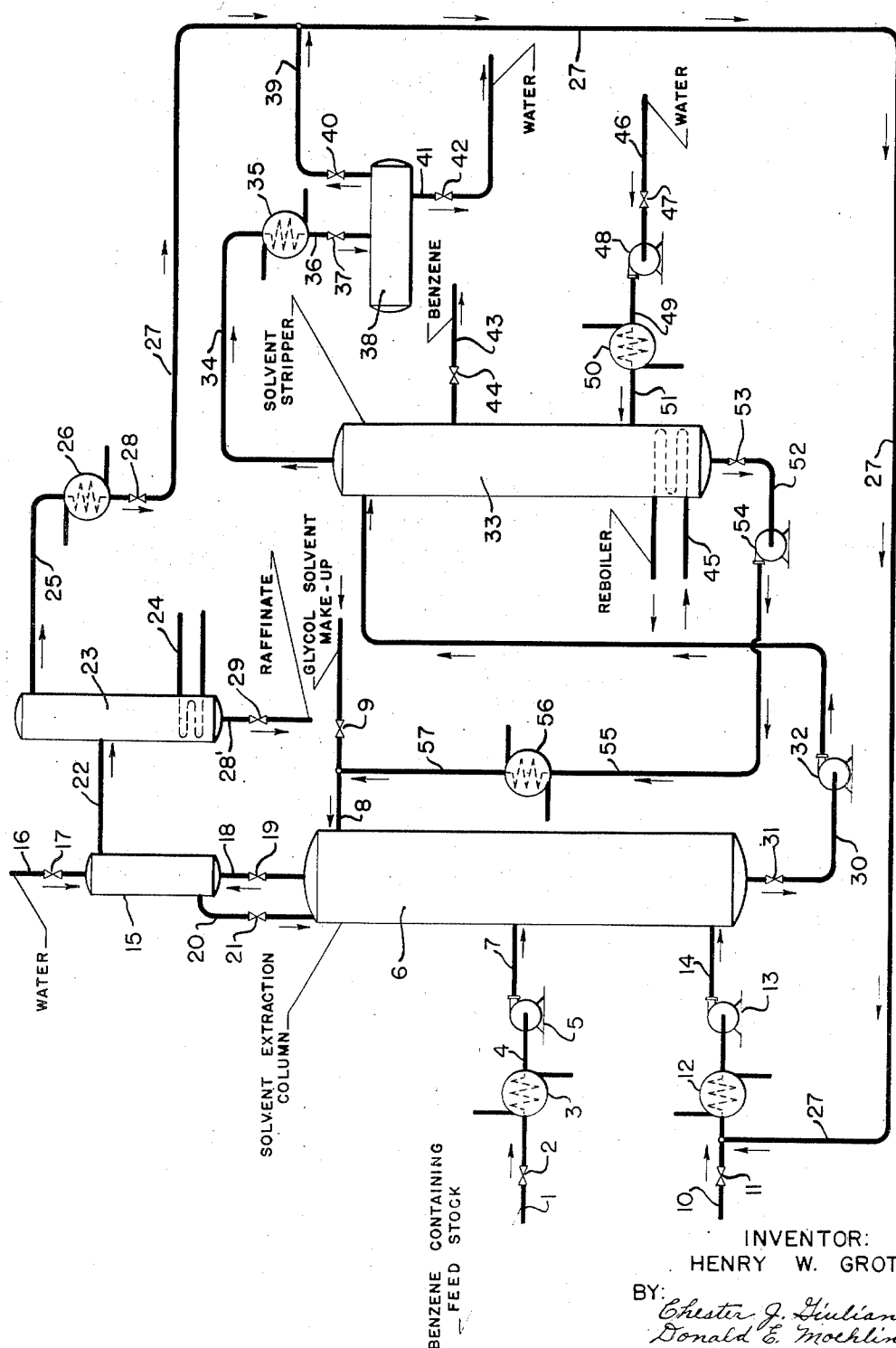

Henry W. Grote, Hinsdale, Ill., assignor to Universal Oil Products Company, Chicago, Ill., a corporation of Delaware Application July 30, 1952, Serial No. 301,778

4 Claims. (Cl. 260—674)

This invention relates to a process for the recovery of a specific component or class of compounds present in a mixture thereof with other components of the same or other classes of compounds employing a system of liquid-liquid countercurrent contact between the solvent and feed stock. More specifically, the invention concerns an improvement in the countercurrent solvent extraction of a mixture of organic compounds wherein a relatively solvent-immiscible normally raffinate-type compound, recoverable by distillation from the raffinate, is utilized as a reflux stream to displace feed stock raffinate components dissolving during the extraction in the extract phase and boiling at or near the boiling point of the desired component to be recovered, the improvement of which comprises distilling said raffinate to recover the reflux component present in the effluent raffinate and recycling the recovered compound to the extraction zone to countercurrently contact said extract therein.

In one of its embodiments the present invention concerns an improvement in the process for the extraction of a feed stock mixture of normally liquid organic compounds containing at least one extractable component relatively soluble in a liquid, solvent therefor, wherein said feed stock is contracted in an extraction zone with said solvent to form a raffinate stream and an extract stream, said extract stream is countercurrently contacted with a reflux compound of the same class as said raffinate and which boils at a temperature below the boiling point of said extractable component and its azeotropes, thereby displacing raffinate components from said extract tending to dissolve therein, said process being further characterized in that the portion of said reflux compound in excess of that which dissolves in said extract to displace raffinate therefrom and which is carried in the raffinate from said extraction zone, the improvement in said process which comprises separating from said raffinate at least a portion of said reflux compound, recycling the thus-separated reflux compound to said extraction zone and contacting said extract therewith.

A more specific embodiment of the invention concerns an improvement in the process for extraction of a liquid hydrocarbon feed stock containing benzene and at least one non-aromatic hydrocarbon having approximately the boiling point of benzene and its hydrocarbon azeotropes which comprises countercurrently contacting said feed stock in an extraction zone with a solvent selectively miscible with benzene to form an extract effluent comprising said solvent, benzene, and a small proportion of a non-aromatic hydrocarbon derived from said feed stock mixture, containing a non-aromatic hydrocarbon boiling at a temperature below the boiling range of benzene and its hydrocarbon azeotropes, thereby displacing from said extract the non-aromatic hydrocarbon derived from said feed stock, and withdrawing a raffinate stream comprising excess reflux and displaced non-aromatic hydrocarbon, the improvement in said process which comprises distilling said reflux hydrocarbon component from said raffinate stream and combining the thus recovered reflux component with said primary reflux stream and countercurrently contacting the combined stream with said extract effluent.

Other embodiments of the present invention relating to specific aspects thereof will be referred to in greater detail in the following further description of the invention.

The process of this invention may be stated as a means for increasing the volume of reflux charged into a countercurrent liquid-liquid extraction process for contact with the fat solvent stream in the extraction column prior to the succeeding stripping operation whereby the reflux volume rate of flow is maintained as large as it is practical to supply to the column by recovering the excess reflux components from the effluent raffinate stream and recycling the same to the extraction column, preferably with as much additional quantity of external reflux as may be supplied to the extraction column. The method provides essentially an improved process for the ultimate production of a substantially pure product extracted by the process from a mixed feed stock of extractable and raffinate-type components.

The present separation process may be applied to any mixture of organic compounds containing at least one component which is relatively more soluble in the solvent than other components of the mixture. In the extraction of a hydrocarbon feed stock mixture, for example, one of the preferred feeds to the process, comprising components of different structural classes, the solubility of the feed stock components in most selective solvents decreases in the general order: aromatic, cyclo-olefinic, branched-chain olefinic, naphthenic, aliphatic olefinic, and aliphatic paraffinic hydrocarbons. Thus, any member in the fore part of the series may generally be separated from any succeeding member of the series, utilizing one of the usual selective solvents and customary extraction procedures. The feed stock in the present separation process may also consist of a mixture of one or more structural classes of hydrocarbons, the component to be separated having preferential or selective solubility in the solvent relative to other components of the mixture.

The selective solvent-extractant employed in the present separation process is a normally liquid organic or inorganic compound which exerts a selective dissolving action toward a particular class of compounds or to one of the components of the feed stock mixture, thereby enabling the extract or fat solvent phase comprising the selectively dissolved component in the solvent to be physically separated from the raffinate or the components of the feed stock rejected by the solvent. The solvent must also have a boiling point sufficiently high to remain substantially in liquid phase when the fat solvent is heated to strip the solute therefrom in the subsequent stripping stage of the process.

Compounds utilizable as solvent are generally selected from a group of organic compounds broadly characterized as oxygen-containing compounds. Particularly suitable solvents are the aliphatic and cyclic alcohols, the glycols and glycol ethers (also referred to as polyalkylene glycols) as well as the glycol esters and glycol ether-esters. Alkylene glycols and polyoxy-polyalkylene glycols which are an effective class of solvents include the di-, tri-, and tetra-oxy-ethylene glycols, particularly oxy-diethylene glycol, mono-, di-, and tri-oxy-propylene glycols and mono-, di-, and tri-oxy-butylene glycols; certain glycol ethers, such as the cellosolve series of compounds (defined structurally as the alkyl ethers of ethylene glycol), including methyl-, ethyl-, propyl-, and butylcellosolve; the carbitols (defined structurally as the alkyl ethers of di-ethylene glycol), such as methyl-, ethyl-, propyl-, and butylcarbitols; the glycol and polyoxyalkylene glycol esters of low molecular weight organic acids such as the acetates and propionates; the aliphatic alcohols, such as propanol, isopropanol, n-butanol, tert-butanol, etc.; certain cyclic alcohols, such as cyclopenthanol, cyclohexanol, cycloheptanol, etc.; and other oxygen-containing organic compounds such as phenol, resorcinol, pyrocatechol, etc.; various alkyl phenols, such as the ortho-, meta-, and para-cresols, thymol, etc.; the organic acid esters, and particularly the fatty acid esters of aliphatic alcohols and especially the esters of relatively low molecular weight organic acids, such as the acetates, propionates, butyrates, and valerates, and other solvents of the general class comprising the oxygen-containing organic compounds hereinabove described and generally well known in the art.

The solvent may optionally contain a secondary component in admixture with the principal solvent component which increases the selectivity of the solvent mixture for the extracted component primarily recovered in the extraction process, the secondary component being a compound which is substantially immiscible with the feed stock. One of the preferred secondary solvents utilizable in admixture with the principal solvent component is water, present in the mixed selective solvent in an amount sufficient to yield a mixture containing from about 5 to about 75% by weight of water and preferably from about 5 to about 25%.

Certain embodiments of the invention and a correlation of the principles upon which the present separation process operates are further explained in the accompanying diagrammatic drawing which represents the process flow typical of one of the preferred embodiments of this invention for the separation of a mixture of organic compounds (one or more components of which are relatively soluble in the solvent) from at least one component which is relatively insoluble in the solvent. In the interest of simplicity, the drawing is described with reference to a petroleum fraction containing an appreciable concentration of aromatic hydrocarbons, such as the product of a hydroforming process. The diagram is described on the basis of recovering a product comprising a benzene concentrate containing at least 95% benzene, and for this purpose a particularly suitable solvent is an aqueous oxy-diethylene glycol-water mixture illustrative of one of the solvent compositions utilizable herein. When the desired product of the process is a specific aromatic hydrocarbon such as benzene, to be recovered in substantially pure condition, a suitable fraction of the initial petroleum distillate is selected which boils within such limits as to eliminate other aromatic hydrocarbons boiling above or below the desired product. Thus, for benzene, the normally liquid petroleum distillate is a fraction boiling at a temperature somewhat below the boiling point of toluene, at 110° C., and preferably at the upper boiling temperature limit of the benzene azeotropes in the fraction, which in the case of a hydroformed petroleum fraction containing paraffin homologs in admixture with benzene, is about 79–80° C. It is most convenient to utilize a debutanized feed stock, and preferably a cut from a gasoline naphtha fraction boiling from about 40° to about 80° C.

Referring to the accompanying flow diagram, representing a process for the recovery of benzene from a petroleum distillate, a benzene-containing gasoline fraction such as a mixture of benzene and paraffins boiling up to about 100° C. is passed through line 1 at a flow rate controlled by valve 2 into heat exchanger 3 containing a heating coil of sufficient capacity to increase the temperature of the feed stock fraction to the desired extraction temperature of from about 50° to about 150° C., preferably from about 125° to about 140° C. The benzene-containing fraction in vapor form is removed from heater 3 through line 4 and compressed by means of pump 5 to a pressure sufficient to maintain the fraction in substantially liquid phase, depending upon the temperature to be utilized in the extraction step, generally from about 1 to about 15 atmospheres. The liquid feed stock at the above indicated pressure and temperature is charged into extraction column 6 through line 7 at a point intermediate the top and bottom of the column, that is, between the respective extract and raffinate effluent outlet ports, as hereinafter indicated, and preferably at a point substantially above the fat solvent outlet in the bottom of the extraction column.

The benzene-containing hydrocarbon feed stock is introduced into solvent extraction column 6 and contacted therein under countercurrent flow conditions with a selective solvent for the benzene component comprising an aqueous solution of oxy-diethylene glycol. The solvent which is the phase of highest density in the extraction column is charged into the upper portion of column 6 through line 8 containing valve 9 from glycol storage or from recycle glycol solvent recovered from the extract or fat solvent, as hereinafter described. Extraction column 6 is a suitable arrangement of conventional liquid-liquid extraction equipment designed to obtain intimate contact between the liquid feed stock and liquid solvent which are at least partially immiscible with each other and may be a packed tower containing a packing with a large superficial area such as berl saddles, etc. or a bubble plate extraction column of well known design and fabrication.

A paraffinic fraction comprising relatively volatile hydrocarbons, relative, that is, to the benzene component in the presence of the solvent, serves as a reflux stream in the present process, to displace higher boiling feed stock paraffins from the fat solvent stream prior to removal of the fat solvent from the extraction column or in a separate column apart from the extraction column. When operating the process to recover benzene as the final extracted product, a light paraffin reflux fraction boiling up to about 60° C., containing predominantly pentane and which may contain in addition certain hexane isomers, such as 2,2-dimethylbutane, 2,3-dimethylbutane, 2-methylpentane, 3-methylpentane; naphthenes such as cyclopentane, methylcyclopentane and various olefin isomers boiling from about 40° to about 60° C., is charged into the process flow from storage through line 10 in controlled amounts determined by valve 11 through heater 12 and pump 13 which raise the temperature and pressure of the light paraffins to the extraction conditions at which column 6 is operated, the fraction thereafter being discharged from pump 15 through line 14 into the lower portion of column 6. The preferred method of operating the present benzene recovery process comprises heating the various streams charged into the extraction column to a temperature of from about 50° to about 250° C., preferably from about 100° to about 150° C. and compressing the hydrocarbons to a pressure sufficient to maintain them in substantially liquid phase for example, at pressures of from about 1 to about 10 atmospheres and thereafter releasing the recovered extract phase from the extraction zone into a solvent stripping column at a lower pressure wherein the light paraffins and benzene are stripped from the solvent at substantially isothermal conditions as hereinafter described.

Due to the selective solubility of the benzene component, relative to other hydrocarbons of the feed stock, in the aqueous diethylene glycol solvent, the benzene tends to transfer into the solvent phase, leaving a solvent-immiscible hydrocarbon raffinate phase relatively lean in benzene and comprising other classes of hydrocarbons such as paraffins present in the feed stock. The relatively dense extract phase gravitates downwardly into the lower portion of column 6, flowing countercurrently against a stream of raffinate hydrocarbons tending to flow into the upper portion of column 6.

In an extraction system in which a secondary solvent such as water is separately mixed with the principal solvent component such as oxy-diethylene glycol, the water required to hydrate the solvent to its selective composition may be introduced into the extraction column at a point above the point of entry for the glycol solvent component and is desirably countercurrently contacted with the raffinate effluent prior to removal of the raffinate from the system and beyond the point at which the raffinate last contacts the solvent. The water thus introduced into the flow readily dissolves the diethylene glycol present in the raffinate hydrocarbon effluent and recovers the solvent for use in the system.

The water introduced into the flow for the purpose of washing the dissolved solvent from the raffinate may be countercurrently contacted with the raffinate in an auxiliary column such as washing column 15, the water being charged into the column through line 16 and valve 17, flowing downwardly through the column against the upwardly flowing raffinate hydrocarbons flowing from the top of column 6 through line 18 and valve 19 into the bottom of washing column 15. The aqueous phase containing the recovered glycol solvent is removed from the bottom of column 15 through line 20 and discharged in controlled amounts determined by valve 21 into the top of extraction column 6 wherein the water and glycol solvent are mixed to form the selective solvent composition provided in the extraction process of the illustrated process. The water for the above raffinate washing procedure may be recycled in the process from the water distilled from the fat solvent in the subsequent stripping stage.

The water-washed raffinate stream is removed from washing column 15 through line 22 and in accordance with the present invention is subjected to fractional distillation to recover the light paraffin reflux hydrocarbons which dissolve in the raffinate effluent of the extraction process, thereby recovering the same for recycling purposes to the bottom of the extraction column 6. The raffinate effluent is charged into distillation column 23 which contains reboiling coil 24, the latter supplying sufficient heat to distill the light paraffins from the raffinate. The vaporized light paraffins are removed as an overhead from fractionating column 23 through line 25, liquefied in condenser 26 and returned to the process flow by discharge into line 27 containing valve 28, line 27 recycling the light paraffins to extraction column 6 by connecting with line 10. In thus utilizing the additional quantity of light paraffins recovered from the raffinate, thereby supplementing the light paraffins supplied to the process from external sources, the volume of light paraffin reflux charged into extraction zone 6 is increased and a greater net displacement of heavy paraffins dissolved in the extract is effected, resulting ultimately in the production of a benzene product of greater purity.

The raffinate stream from which the light paraffin reflux hydrocarbon has been recovered in distillation column 23 is removed from the bottom of the column through line 28' and valve 29 to storage or into a gasoline blending tank wherein the residual naphtha components may be combined with other gasoline boiling range fractions to form a by-product of the present naphtha feed stock.

Referring again to countercurrent extraction column 6 of the accompanying diagram, the extract phase or fat solvent stream which tends to flow downwardly through the column due to its relatively greater density in comparison to the hydrocarbon feed stock is withdrawn from the bottom of extraction column 6 through line 30 in controlled amounts determined by valve 31 and is transferred by means of pump 32 at the ambient temperature and pressure maintained in extraction column 6 into the top of solvent stripping column 33. The extract phase or fat solvent stream is a solution comprising the relatively non-volatile oxy-diethylene glycol solvent, the volatile water component, dissolved benzene extracted from the naphtha feed stock and a small amount, relative to the quantity of benzene contained in the extract, of dissolved light paraffin reflux hydrocarbons present therein by virtue of having displaced the less volatile, azeotrope-forming feed stock paraffins normally present in the fat solvent stream when operating the process in the absence of the light paraffin reflux. The fat solvent at the elevated temperature and superatmospheric pressure conditions maintained in extraction column 6 is flashed in column 33 to separately recover the various volatile and non-volatile components of the stream by reducing the ambient pressure and/or heating the liquid fat solvent charged thereto. Column 33 may be of any suitable design, but is preferably a flash chamber designed to operate at substantially the same temperature as solvent extraction column 6, but at a somewhat reduced pressure, sufficient to vaporize the solute components of the fat solvent from the relatively non-volatile glycol. By reducing the ambient pressure on the fat solvent stream, the sensible heat contained in this stream is generally sufficient to vaporize substantially all of the light paraffins dissolved in the liquid solvent, a portion of the benzene, and also the water in the extract. The light vapors thus flashed from the liquid are removed therefrom through vapor overhead line 34 and passed into condenser 35 wherein the overhead vapors are condensed to a liquid, which is removed therefrom through line 36 containing valve 37 and stored in receiver vessel 38. The vapor overhead contains substantially all of the light paraffin reflux hydrocarbons present in the fat solvent stream also contains a small quantity of water vapor and sufficient benzene to remove substantially all of the light paraffins from the fat solvent as a fraction more volatile than benzene and vaporized from stripping column 34. The water vapors liquefied in condenser 35 accumulate as a lower liquid layer in receiver vessel 38 below the upper layer comprising the light paraffin-containing overhead condensate. The light paraffins and any benzene coming over with the paraffins from column 33, comprising the upper layer in receiver 38, are removed from the latter vessel through line 39, valve 40 and are combined with the light paraffin reflux hydrocarbons distilled from the raffinate phase hereinbefore described by juncture of line 39 with line 27 which recycles combined light paraffin reflux stream into line 10 leading into column 6.

The water condensate in receiver vessel 38 is withdrawn therefrom through line 41 and valve 42 and discharged from the process flow or diverted into a water recycle line, not shown for conversion to steam for stripping purposes in column 33 or to the raffinate washing column 15 to remove solvent dissolved in the raffinate effluent from column 6.

Column 33 is operated under conditions to obtain a rough separation of the fat solvent into a light paraffin vapor overhead, an intermediate cut of somewhat higher boiling point comprising benzene and water, and a high boiling distillation residue substantially free of volatile components comprising an oxy-diethylene glycol primary solvent. The intermediate benzene-containing fraction recovered from column 33 is removed as a vapor sidecut through line 43 and valve 44 to liquefaction equipment, not shown and thereafter to storage as the principal product of the present process. The benzene product thus recovered is substantially pure benzene, free of paraffinic and other hydrocarbon impurities when the solvent extraction process is operated in accordance with the present invention wherein the paraffin reflux hydrocarbon is employed in the process.

In order to strip the last traces of dissolved benzene from the extract residue and maintain the water content of the solvent, the fat solvent residue accumulating in the bottom portion of column 33 is preferably heated, for example, by reboiling coil 45 through which a hot fluid is circulated and heat exchanged with the fat solvent residue. The last traces of the extracted hydrocarbon (dissolved benzene) may be removed from the fat solvent residue without heating the solvent to temperatures above its thermal stability by injecting a vapor or vaporized liquid into the reboiling section of column 33 wherein the heated vapor exerts its own partial pressure to increase the vapor pressure of the residual benzene component present in the extract bottoms. One of the preferred vapors for this purpose in the present operation is steam, supplied to the process in the form of water through line 46, in amounts controlled by valve 47 and pumped under pressure by means of pump 48 into line 49, through heat exchanger 50 which vaporizes the water into steam, the latter being charged into the reboiling section of column 33 through line 51 to effect stripping of the residue of benzene in the fat solvent stream entering the reboiling section of column 33.

The extract residue comprising lean oxy-diethylene glycol solvent from which the volatile hydrocarbon solute components have been substantially completely removed is withdrawn from column 23 at the temperature of the reboiling coil through line 52 and valve 53 and recycled at the operating pressure existing in solvent extraction column 6 by means of pump 54 into the top of column 6, pump 54 discharging the aqueous glycol into line 55, through heat exchanger 56 wherein the lean glycol solvent is heated to the temperature maintained in solvent extraction column 6 and thereafter into line 57 which connects with glycol charging line 8.

The present invention is further illustrated with respect to certain specific embodiments in the following examples, which, however, are not intended to define the scope of the invention or restrict its application necessarily thereto.

*Example I*

A selective solvent extraction system embodying the preferred arrangement of apparatus described in the accompanying diagrammatic drawing is provided to recover benzene from a hydroformed straight run gasoline fraction. The hydroformate is fractionally distilled to separate a fraction having a boiling range of from about 40° to about 81° C. and the latter distillate further fractionated into a light paraffin-containing fraction boiling from about 40° to about 65° C. and a fresh feed stock fraction boiling from about 65° to about 81° C. The latter fraction containing $C_6$ and $C_7$ isomeric paraffins and about 25% by weight of benzene is charged at a temperature of 135° C. and at a pressure of 100 lbs./in.$^2$ into a sieve-deck extraction column at a rate of 1650 gallons per hour. A second stream, comprising recycled stripper overhead, formed as hereinafter indicated is charged into the extraction column below the fresh feed inlet thereto at a rate of 1,270 gallons per hour, the stream being heated to 135° C. and pressured to 100 lbs./in.$^2$ before being fed into the extraction column. The volatile light paraffin fraction boiling from 40° to about 65° C. and separated from the initial reformate charged to the fractionator is reserved for use as a reflux stream in a subsequent operation, hereinafter referred to. The fresh feed stock fraction is charged into the extraction column at an intermediate point of the column, about midway between the raffinate outlet at the top of the column and the extract outlet at the bottom of the column and percolated upwardly through the perforations in the superimposed sieve-deck trays against a downwardly flowing stream of selective solvent comprising an aqueous solution of oxy-diethylene glycol containing 7.5% by weight of water. The latter solvent stream is charged into the extraction column at a rate of 11,840 gallons per hour, the solvent stream flowing downwardly through the extraction column, through the perforated sieve-deck plates and mixes with the feed stock flowing upwardly through the column. The fat solvent stream at the point of entry of the feed stock into the column contains approximately 21.2% by weight (3800 gallons per hour) of hydrocarbon solute comprising dissolved benzene and about 1% by weight of the benzene in the fat solvent of feed stock paraffins boiling from about 65° to about 81° C. The fat solvent stream accumulates in the bottom portion of the extraction column and a raffinate phase from which the benzene component has been removed accumulates in the upper portion of the column. The extract stream is charged at the above extraction temperature and pressure conditions into a flash distillation column containing an uppermost flashing section maintained at a pressure of about 50 lbs./in.$^2$ and a fractionating section operated at about 3 lbs./in.$^2$ gage pressure. A fraction containing vapors of all of the paraffins present in the fat solvent, most of the benzene, and some of the water in the fat solvent is flashed overhead from the flashing section of the column into an overhead condenser from which a liquid condensate is withdrawn into a receiver vessel. A reboiling coil in the lower portion of the fractionating column maintains the lean solvent (or fat solvent residue) accumulating in the lower portion of the column at a temperature of about 135° C. as the volatile components are distilled from the fat solvent stream entering the column.

The water and hydrocarbon condensate separates into two layers in the receiver vessel, the upper hydrocarbon layer being separately withdrawn to storage. Since, however, the overhead (recovered from the overhead condenser at the rate of 3475 gallons per hour) contains a large proportion of benzene contaminated with feed stock paraffin hydrocarbons present in the fat solvent with which the benzene forms an azeotrope in the distillation, and since this fraction is not an economically valuable benzene product because of its contamination with paraffins, the overhead is recycled to the extraction column to recover the benzene component therefrom. This fraction is introduced at the rate it is recovered in the stripping column (i. e. at 3475 gallons per hour) into the extraction column below the point of entry for the fresh feed stock fraction, and preferably at a point in the column just above the rich solvent outlet at the bottom of the extraction column. In order to remove all of the paraffinic hydrocarbon contaminants from the fat solvent stream by azeotrope formation with benzene, approximately 91% of the benzene in the fat solvent must be distilled into the overhead stream, the benzene therein being continuously recycled to the extraction column as recycle feed. The fat solvent residue, free from paraffinic contaminants, flows into the distillation section of the column and a benzene-water fraction distilled therefrom as an intermediate side-cut. The remaining 9% of the benzene originally present in the fat solvent stream (326 gallons per hour) is thus vaporized and recovered as the intermediate side-cut from the column. Approximately 27,000,000 B. t. u/hr. are required for operation of the reboiler section of the stripping column in order to recover the above quantity of benzene from the feed stock. The total recovery of benzene from the feed stock represents about 97% of that present in the initial feed stock.

The aqueous stream removed from the overhead and sidecut receivers is separated into two streams, one stream of which at the rate of 119 gallons per hour is recirculated to the water inlet port of the solvent extraction column and the other stream at a pressure of 10 lbs./in.$^2$ and at a temperature of 140° C. is recirculated to the reboiling section of the solvent stripping column at a rate of 156 gallons per hour to strip benzene from the rich solvent residue which accumulates in the reboiling section of the column. The lean glycol solvent is removed from the bottom of the solvent stripping column at a rate of 11,720 gallons per hour and recycled to the solvent inlet port of the solvent extraction column where it combines with the recycled water to form the selective solvent.

*Example II*

In an extraction operation similar to the above, except that the light paraffin fraction separated from the original naphtha charge stock and boiling from about 40° to about 65° C., in an amount representing approximately 1.6% by volume of the feed stock charged into the process (about 26 gallons per hour in the process in which the feed stock is charged at the rate of 1650 gallons per hour) is introduced into the bottom of the solvent extraction column through an inlet port contiguous to the fat solvent outlet port at a temperature of 130° C. and at a pressure of 100 pounds per square inch and allowed to flow upwardly through the perforated sieve-decks against the downwardly flowing stream of fat solvent comprising the selective glycol solvent containing the dissolved benzene and feed stock paraffins therein. Prior to the introduction of the light paraffin reflux stream into the bottom of the solvent extraction column, the fat solvent stream removed from the solvent extraction column contains approximately 18.3% by weight of hydrocarbon solute (3282 gallons per hour) of which 89% by weight is benzene, 7% by weight is feed stock paraffins and 4% by weight is light paraffins present in the extract by virtue of having displaced an equivalent volume of feed stock, heavy paraffins. The fat solvent stream removed from the bottom of the solvent extraction column is charged into the solvent stripping column as in the preceding operation at a temperature of approximately 135° C. The vapor overhead fraction flashed from the rich solvent by reduction of the pressure on the extract stream to 50 lbs./in.$^2$ is a mixture of water vapor, light paraffin hydrocarbons and feed stock paraffins, the liquid hydrocarbon condensate (totaling 2956 gallons per hour) containing about 2450 gallons per hour of benzene. The overhead stream is condensed, and recycled to the bottom of the extraction column at the above rate of 2956 gallons per hour to recover the benzene component therefrom. An intermediate boiling range side-cut fraction, the benzene product of the process, removed from the solvent stripping column as a fraction boiling at about 70° C. and containing about 99.5% benzene is recovered from the side-cut condenser at a rate of 326 gallons per hour. The stripping column reboiler duty under the above process conditions is 22,500,000 B. t. u./hr. The total recovery of benzene represents about 98% of that present in the initial feed stock. The raffinate stream removed from the top of the solvent extraction column contains about 3.3% by volume of the light paraffin fraction charged into the process as reflux and boiling from about 40° to about 65° C.

By charging the light paraffin reflux fraction into the bottom of the extraction column to contact the fat solvent stream under countercurrent flow conditions and thereby displace a portion of the heavy, feed stock paraffins normally present in the fat solvent stream, the rate of 99.5% pure benzene production in the process was maintained at 326 gallons per hour, but the heat requirement for operation of the stripping column (reboiler duty) was reduced from 27,000,000 B. t. u./hr. to 22,500,000 B. t. u./hr. by reducing the recycle hydrocarbon inventory in the solvent (overhead recycle) from 3475 to 2956 gallons per hour.

*Example III*

In a similar extraction-stripping procedure as described above (charging about 1650 gallons per hour of the previously supplied naphtha feed stock, 11,850 gallons per hour of 7.5% aqueous diethylene glycol at 135° C. and 100 lbs./in.$^2$ pressure) except that the 40°–65° C. light paraffin reflux fraction recovered from the raffinate stream and naphtha feed stock is charged into the process flow at the rate of 3.2% by volume of the 65°–81° C. fraction of the feed stock (52 gallons per hour), the light paraffin reflux fraction from the above sources being combined with the recycled vapor overhead fraction from the fat solvent stripping column (having a total volume of 2,514 gallons per hour of which 382 gallons per hour is light paraffins and 2,132 gallons per hour is benzene) and the combined stream charged into the bottom of the solvent extraction column. The total volume of the combined light paraffin stream now represents approximately 26.5% by volume of the feed stock fraction introduced into the solvent extraction column (434 gallons per hour). The stripping column reboiler duty or heat supplied to the stripping column to remove the benzene from the fat solvent stream is 16,400,000 B. t. u./hr., the recycle hydrocarbon inventory in the solvent being reduced to 2,514 gallons per hour. The benzene product recovered as the side-cut intermediate fraction from the solvent stripping column is 99.9% pure benzene, produced at the rate of 326 gallons per hour. The paraffin content of the overhead fraction from the solvent stripping column is entirely light paraffins which are present in the extract stream charged to the column by virtue of having displaced the feed stock paraffins and when the overhead fraction is combined with the light paraffins fractionated from the feed stock, the combined stream has a greater effect on producing a higher yield of pure benzene product.

The advantages obtained in the purity and percent recovery of the benzene product by recovering the volatile paraffin reflux from the raffinate effluent and recycling the paraffins to the extraction zone as reflux therein is conclusively demonstrated in Examples I to III, above, the purity and yield of benzene progressively increasing as the quantity of light paraffin reflux is increased.

I claim as my invention:

1. A process for producing an aromatic concentrate from a reformed gasoline product which comprises separating from the reformed product a light paraffinic fraction boiling between about 40° C. and about 65° C. and a heavier fraction containing aromatic and paraffinic hydrocarbons, countercurrently contacting said heavier fraction with an aqueous polyoxy-polyalkylene glycol solvent for aromatics in an extraction zone, thereby forming a paraffinic raffinate and an aromatic extract containing a small amount of relatively heavy paraffins, countercurrently contacting said extract in said zone with a quantity of said light paraffinic fraction in excess of that required to displace from the extract said small amount of relatively heavy paraffins, removing the excess of said light fraction from said zone in admixture with said raffinate, distilling the withdrawn raffinate to separate said excess of light paraffinic hydrocarbons therefrom and returning the latter to said zone for further countercurrent contact with the extract therein, and distilling light paraffins from said extract and returning the same to the extraction zone together with the light paraffins separated from said raffinate.

2. The process of claim 1 further characterized in that said solvent comprises aqueous oxy-diethylene glycol.

3. The process of claim 1 further characterized in that said solvent and light paraffinic hydrocarbons are introduced to the upper and lower portions, respectively, of the extraction zone and said heavier fraction is introduced to an intermediate portion of said zone.

4. The process of claim 1 further characterized in that said heavier fraction is a benzene-containing cut boiling from about 65° C. to about 80° C.

References Cited in the file of this patent
UNITED STATES PATENTS

| | | |
|---|---|---|
| Re. 19,763 | Tuttle | Nov. 19, 1935 |
| 2,070,384 | Tuttle | Feb. 9, 1937 |
| 2,079,885 | Voorhees | May 11, 1937 |
| 2,407,820 | Durrum | Sept. 17, 1946 |
| 2,562,068 | Souders | July 24, 1951 |
| 2,632,030 | Francis | Mar. 17, 1953 |
| 2,633,448 | Neuworth | Mar. 31, 1953 |